United States Patent
Xu et al.

(10) Patent No.: US 10,497,144 B2
(45) Date of Patent: Dec. 3, 2019

(54) VEHICLE INSPECTION SYSTEM, AND METHOD AND SYSTEM FOR IDENTIFYING PART OF VEHICLE

(71) Applicant: Nuctech Company Limited, Beijing (CN)

(72) Inventors: Yanwei Xu, Beijing (CN); Zheng Hu, Beijing (CN); Yongming Wang, Beijing (CN); Chuan Gao, Beijing (CN); Weifeng Yu, Beijing (CN); Qiang Li, Beijing (CN); Yuan Ma, Beijing (CN); Jianping Gu, Beijing (CN); Yu Hu, Beijing (CN); Shangmin Sun, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 101 days.

(21) Appl. No.: 15/852,103

(22) Filed: Dec. 22, 2017

(65) Prior Publication Data
US 2018/0182126 A1   Jun. 28, 2018

(30) Foreign Application Priority Data
Dec. 28, 2016   (CN) .......................... 2016 1 1236364

(51) Int. Cl.
*G06K 9/00*   (2006.01)
*G06K 9/62*   (2006.01)
(Continued)

(52) U.S. Cl.
CPC ............ *G06T 7/74* (2017.01); *G06K 9/00771* (2013.01); *G06K 9/6262* (2013.01);
(Continued)

(58) Field of Classification Search
CPC ... G06T 7/74; G06T 3/40; G06T 2207/20084; G06T 2207/30248; G06T 2207/20081;
(Continued)

(56) References Cited

U.S. PATENT DOCUMENTS

2018/0293552 A1* 10/2018 Zhang ................. G06N 3/0454

FOREIGN PATENT DOCUMENTS

EP   3 035 245 A1   6/2016
EP   3 128 496 A1   2/2017
(Continued)

OTHER PUBLICATIONS

English translation of WO 2016107475 A1 (Year: 2016).*
Extended European Search Report dated May 9, 2018 received in European Patent Application No. 17 210 936.5.

*Primary Examiner* — Jon Chang
(74) *Attorney, Agent, or Firm* — Scully Scott Murphy & Presser

(57) ABSTRACT

The present disclosure discloses a method and system for identifying a part of a vehicle and a vehicle inspection system. The method includes: acquiring a vehicle body image sequence of a vehicle to be identified; reconstructing the vehicle body by using a first vehicle body reconstruction model generated through a deep learning algorithm and on the basis of the vehicle body image sequence, so as to acquire a vehicle body reconstruction image of the vehicle to be identified; and identifying a boundary identifier of the vehicle to be identified on the basis of the vehicle body reconstruction image of the vehicle to be identified.

15 Claims, 2 Drawing Sheets

(51) Int. Cl.
  *G06N 3/04*      (2006.01)
  *G06N 3/08*      (2006.01)
  *G06T 7/73*      (2017.01)
  *G06T 3/40*      (2006.01)

(52) U.S. Cl.
  CPC ............. *G06N 3/0472* (2013.01); *G06N 3/08* (2013.01); *G06T 3/40* (2013.01); *G06T 2207/20081* (2013.01); *G06T 2207/20084* (2013.01); *G06T 2207/30248* (2013.01)

(58) Field of Classification Search
  CPC .............. G06T 3/4046; G06K 9/00791; G06K 9/00771; G06K 9/6262; G06N 3/0472; G06N 3/08; G01N 21/9515; G01N 21/8851; G06Q 99/00
  See application file for complete search history.

(56) References Cited

FOREIGN PATENT DOCUMENTS

WO    2016/107475 A1    7/2016
WO    WO-2016107475 A1 *  7/2016 ............. G08G 1/017

\* cited by examiner

VEHICLE INSPECTION SYSTEM, AND METHOD AND SYSTEM FOR IDENTIFYING PART OF VEHICLE

CROSS-REFERENCE TO RELATED APPLICATIONS

This application is based upon and claims priority to Chinese Patent Application No. 201611236364.5, filed Dec. 28, 2016, the entire contents of which are incorporated herein by reference.

TECHNICAL FIELD

The present disclosure relates to the field of vehicle identification and vehicle safety inspection technologies, and more particularly, to a method for identifying a part of a vehicle, a system for identifying a part of a vehicle, and a vehicle inspection system using the system for identifying a part of a vehicle.

BACKGROUND

With the continuous improvement of people's living standards, the total ownership of vehicles like cars has also begun to grow rapidly. The requirements of people on vehicle management are also getting higher and higher. A certain part of the vehicle needs to be identified at the vehicle entrances and exits of various car parks, toll gates, agency units, and communities according to specific requirements.

For example, in the field of vehicle safety inspection, container trucks and various wagons need to be inspected without stopping, which can greatly improve the safety inspection efficiency. In such a case, the driver is required to drive the vehicle through a ray irradiation area, while the driver is greatly injured since the energy and dose of an accelerator or a radioactive source are generally high. Therefore, how to accurately identify a cab (a head part of the vehicle) where the driver locates is particularly important for controlling the ray source not to irradiate the cab or irradiate the cab with a low dose.

At present, a common method is to capture all or most of the vehicle body image of the vehicle to be inspected through an image data collection device, and to determine information in the vehicle body image based on the collected body pattern with reference to a rule acquired according to empirical values and analysis, so as to separate the vehicle head (a front part of the vehicle) from the vehicle body. After determining that the vehicle head of the vehicle to be inspected has passed through the ray irradiation area on the basis of the result of separating the vehicle head from the vehicle body in the vehicle body image of the vehicle to be inspected, a compartment behind the vehicle head is irradiated.

In the above manner, on one hand, it is necessary to collect a whole or most of the vehicle body image of the vehicle to be inspected to identify the position of the vehicle head, which reduces the speed of identifying the position of the vehicle head, thereby reducing the speed of vehicle safety inspection, and increasing the identification cost. On the other hand, only the positions of the vehicle heads of a part of specific vehicles can be identified by determining the position of the vehicle head in the vehicle body image by the rule acquired through experiences and analysis, and when identifying the positions of vehicle heads of other vehicles, the situations of slow identification speed or misjudgment will occur, which reduces the efficiency of head position identification, and meanwhile, a great risk to the safety of the driver may be caused in case of misjudgment.

It should be noted that the information disclosed in the above background section is only for enhancement of understanding the background of the present disclosure, and therefore can include other information that does not form the prior art that is already known to those having ordinary skills in the art.

SUMMARY

The present disclosure aims at providing a method for identifying a part of a vehicle, a system for identifying a part of a vehicle and a vehicle inspection system applying the system for identifying a part of a vehicle, so as to at least overcome one or more problems caused by the limitations and defects of the related art to a certain extent.

According to an aspect of the present disclosure, there is provided a method for identifying a part of a vehicle, including:

collecting a vehicle body image of a vehicle to be identified to acquire a vehicle body image sequence of the vehicle to be identified;

reconstructing the vehicle body by using a first vehicle body reconstruction model generated through a deep learning algorithm and on the basis of the vehicle body image sequence to acquire a vehicle body reconstruction image of the vehicle to be identified; and identifying a boundary identifier between a preset part and other parts of the vehicle to be identified to acquire a position of the preset part.

In an exemplary embodiment of the present disclosure, the method further includes:

determining a type of the vehicle to be identified on the basis of the vehicle body reconstruction image of the vehicle to be identified;

wherein, after determining that the type of the vehicle to be identified belongs to a preset type, a boundary identifier between the preset part and other parts of the vehicle to be identified is identified on the basis of the vehicle body reconstruction image of the vehicle to be identified, to acquire the position of the preset part.

In an exemplary embodiment of the present disclosure, the method further includes: generating the first vehicle body reconstruction model through a deep learning algorithm, which includes:

acquiring a plurality of first sample vehicle body images in which the preset parts are identified;

acquiring a plurality of second sample vehicle body images in which the preset parts are to be identified;

identifying the preset parts in the second sample vehicle body images through a preset deep learning algorithm to determine a first parameter of a second body reconstruction model; and inputting the first sample vehicle body images into the second body reconstruction model to correct the first parameter, so as to obtain the first vehicle body reconstruction model.

In an exemplary embodiment of the present disclosure, the identifying the preset parts in the second sample vehicle body images through the preset deep learning algorithm to determine the first parameter of the second body reconstruction model includes:

initializing the first parameter in a restricted Boltzmann machine model, and setting a training period, a learning rate and a parameter k of a training algorithm of the restricted Boltzmann machine model;

in the training period, invoking the training algorithm in combination with the learning rate and the parameter k, and inputting the second sample vehicle body images into the restricted Boltzmann machine model to perform training for k times, so as to obtain an increment of the first parameter; and updating the first parameter according to the increment of the first parameter, and obtaining the second body reconstruction model on the basis of the restricted Boltzmann machine model and the updated first parameter.

In an exemplary embodiment of the present disclosure, the identifying the preset parts in the second sample vehicle body images through the preset deep learning algorithm to determine the first parameter of the second body reconstruction model includes:

setting a training period and running time in a cyclic neural network model;

determining whether the training period ends when the running time is t;

when determining that the training period does not end, inputting the second sample vehicle body images into the cyclic neural network model to obtain an $n^{th}$ output, identifying the boundary identifier for an $n^{th}$ time on the basis of the $n^{th}$ output, and adjusting the first parameter after $(n-1)^{th}$ adjustment for an $n^{th}$ time on the basis of the $n^{th}$ identification of the boundary identifier; and when determining that the training period ends, obtaining the second body reconstruction model on the basis of the first parameter after $(n-1)^{th}$ adjustment.

In an exemplary embodiment of the present disclosure, the method, before the reconstructing the vehicle body by using the first vehicle body reconstruction model generated through the deep learning algorithm and on the basis of the vehicle body image sequence, further includes:

zooming a resolution of the collected vehicle body image of the vehicle to be identified to a preset resolution, and performing a grayscale stretching on the zoomed vehicle body image of the vehicle to be identified to obtain a normalized image of the vehicle body image of the vehicle to be identified; and segmenting the normalized image with a fixed threshold value, wherein pixels in the normalized image greater than the threshold value are served as the vehicle body, and pixels in the normalized image less than or equal to the threshold value are served as a background.

In an exemplary embodiment of the present disclosure, the collecting the vehicle body image of the vehicle to be identified includes:

determining whether the position of the preset part is already acquired; and when determining that the position of the preset part is not acquired yet, inputting a vehicle body image collected before current moment and at the current moment into the first vehicle body reconstruction model.

In an exemplary embodiment of the present disclosure, the preset part of the vehicle to be identified is a vehicle head.

According to an aspect of the present disclosure, there is provided a system for identifying a part of a vehicle, including:

an image collection module configured to collect a vehicle body image of a vehicle to be identified to acquire a vehicle body image sequence of the vehicle to be identified;

an image reconstruction module configured to reconstruct the vehicle body by using a first vehicle body reconstruction model generated through a deep learning algorithm and on the basis of the vehicle body image sequence, to acquire a vehicle body reconstruction image of the vehicle to be identified; and a first identification module configured to identify a boundary identifier between a preset part and other parts of the vehicle to be identified on the basis of the vehicle body reconstruction image of the vehicle to be identified, to acquire a position of the preset part.

In an exemplary embodiment of the present disclosure, the system further includes:

a first determination module configured to determine a type of the vehicle to be identified on the basis of the vehicle body reconstruction image of the vehicle to be identified; and wherein, the first identification module is configured to, after determining that the type of the vehicle to be identified belongs to a preset type, identify the boundary identifier between the preset part and other parts of the vehicle to be identified on the basis of the vehicle body reconstruction image of the vehicle to be identified, to acquire the position of the preset part.

In an exemplary embodiment of the present disclosure, a first vehicle body reconstruction module is further included, which includes:

a first acquisition unit configured to acquire a plurality of first sample vehicle body images in which the preset parts are identified;

a second acquisition unit configured to acquire a plurality of second sample vehicle body images in which the preset parts are to be identified;

a parameter determination unit configured to identify the preset parts in the second sample vehicle body images through a preset deep learning algorithm to determine a first parameter of a second body reconstruction model; and a vehicle body reconstruction unit configured to input the first sample vehicle body images into the second body reconstruction model to correct the first parameter, so as to obtain the first vehicle body reconstruction model.

In an exemplary embodiment of the present disclosure, the identifying the preset parts in the second sample vehicle body images through the preset deep learning algorithm to determine the first parameter of the second body reconstruction model includes:

initializing the first parameter in a restricted Boltzmann machine model, and setting a training period, a learning rate and a parameter k of a training algorithm of the restricted Boltzmann machine model;

in the training period, invoking the training algorithm in combination with the learning rate and the parameter k, and inputting the second sample vehicle body images into the restricted Boltzmann machine model to perform training for k times, to obtain an increment of the first parameter; and updating the first parameter according to the increment of the first parameter, and obtaining the second body reconstruction model on the basis of the restricted Boltzmann machine model and updated the first parameter.

In an exemplary embodiment of the present disclosure, the identifying the preset parts in the second sample vehicle body images through the preset deep learning algorithm to determine the first parameter of the second body reconstruction model includes:

setting a training period and running time in a cyclic neural network model;

determining whether the training period ends when the running time is t;

when determining that the training period does not end, inputting the second sample vehicle body images into the cyclic neural network model to obtain an $n^{th}$ output, identifying the boundary identifier for an $n^{th}$ time on the basis of the $n^{th}$ output, and adjusting the first parameter after $(n-1)^{th}$ adjustment for an $n^{th}$ time on the basis of the $n^{th}$ identification of the boundary identifier; and when determining that the training period ends, obtaining the second body reconstruction model on the basis of the first parameter after $(n-1)^{th}$ adjustment.

In an exemplary embodiment of the present disclosure, the system, before the image reconstruction module, further includes:

an image normalization module configured to zoom a resolution of the collected vehicle body image of the vehicle to be identified to a preset resolution, and perform a gray-scale stretching on the zoomed vehicle body image of the vehicle to be identified to obtain a normalized image of the vehicle body image of the vehicle to be identified; and a threshold value segmentation module configured to segment the normalized image with a fixed threshold value, wherein pixels in the normalized image greater than the threshold value are served as the body, and pixels in the normalized image less than or equal to the threshold value are served as a background.

In an exemplary embodiment of the present disclosure, the image collection module includes:

a second determination unit configured to determine whether the position of the preset part is already acquired; and an image input unit configured to, when determining that the position of the preset part is not acquired yet, input a vehicle body image collected before current moment and at the current moment into the first vehicle body reconstruction model.

In an exemplary embodiment of the present disclosure, the preset part of the vehicle to be identified is a vehicle head.

According to an aspect of the present disclosure, there is provided a vehicle inspection system, wherein the system includes any one of the above-mentioned system for identifying a part of a vehicle.

According to the method for identifying a part of a vehicle, the system for identifying a part of a vehicle and the vehicle inspection system applying the system for identifying a part of a vehicle provided by the exemplary embodiments of the present disclosure, the vehicle body is reconstructed by using the first vehicle body reconstruction model generated through the deep learning algorithm and on the basis of the vehicle body image sequence to acquire the vehicle body reconstruction image of the vehicle to be identified, and the boundary identifier of the vehicle to be identified is identified on the basis of the vehicle body reconstruction image of the vehicle to be identified to acquire the position of the preset part. The vehicle body images of various types of vehicles to be identified can be reconstructed by using the first vehicle body reconstruction model generated through the deep learning algorithm, and the boundary identifier is identified on the basis of the vehicle body reconstruction image; therefore, the situation in the above-mentioned background section that only specific vehicles can be identified on the basis of rule is avoided, the identification accuracy rate of the boundary identifier is increased, and the identification speed is quickened, so as to eliminate safety risks to a great extent.

BRIEF DESCRIPTION OF THE DRAWINGS

The above and other features and advantages of the present disclosure will become more apparent by describing the example embodiments thereof in detail with reference to the drawings. Obviously, the following drawings merely relate to some embodiments of the present disclosure, and based on these drawings, those having ordinary skills in the art may obtain other drawings without any inventive labor. In the drawings.

DETAILED DESCRIPTION

Figure 1:
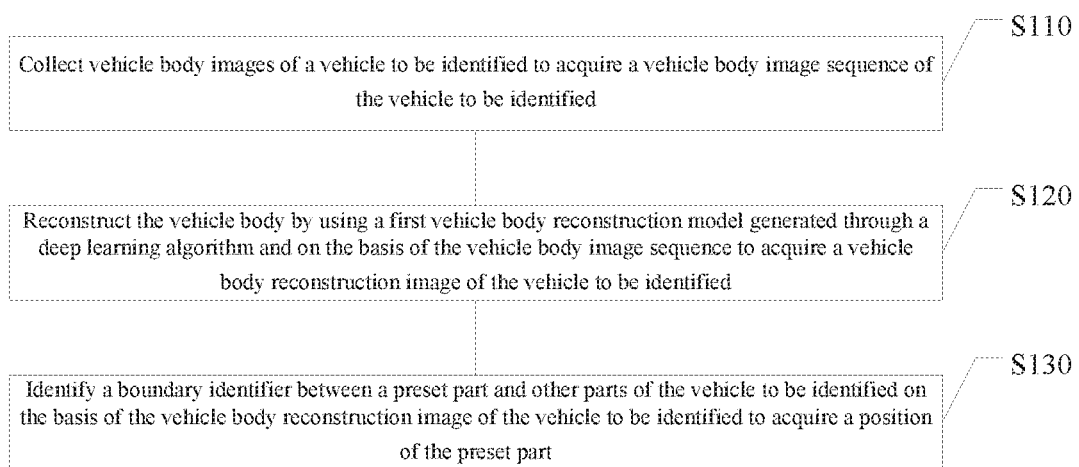
FIG. 1 is a flow chart of a method for identifying a part of a vehicle according to the present disclosure.

The example embodiments are described more comprehensively now with reference to the drawings. However, the example embodiments can be implemented in many forms and should not be construed as being limited to the embodiments set forth herein; on the contrary, these embodiments are provided so that the present disclosure will be comprehensive and complete, and the concept of the exemplary embodiments is fully conveyed to those skilled in the art. The same reference numerals in the drawings represent the same or similar parts, and repeated descriptions thereof will be omitted.

In addition, the described features, structures, or characters can be combined in one or more embodiments in any suitable manner. In the following description, a number of specific details are provided to give a full understanding of the embodiments of the present disclosure. However, it will be appreciated by those skilled in the art that the technical solution of the present disclosure without one or more of the specific details can be practised, or other methods, constituent elements, materials, devices and steps can be adopted. In other cases, the known structures, methods, devices, implementations, materials, or operations are not shown or described in detail to avoid all aspects of the present disclosure are blurred.

The block diagrams shown in the drawings are merely functional entities and do not necessarily correspond to physically separate entities. That is, a software form can be used to achieve these functional entities, or a part of these functional entities are achieved in one or more software-hardened modules, or these functional entities are achieved in different networks and/or processor devices and/or micro-controller devices.

In the exemplary embodiment, a method for identifying a part of a vehicle is disclosed firstly. As shown in FIG. 1, the method for identifying a part of a vehicle may include the following steps.

In step S110, vehicle body images of a vehicle to be identified are collected to acquire a vehicle body image sequence of the vehicle to be identified.

In step S120, a vehicle body is reconstructed by using a first vehicle body reconstruction model generated through a deep learning algorithm and on the basis of the vehicle body image sequence, so as to acquire a vehicle body reconstruction image of the vehicle to be identified.

In step S130, a boundary identifier between a preset part and other parts of the vehicle to be identified is identified to acquire a position of the preset part.

According to the method for identifying a part of a vehicle in the exemplary embodiment, the vehicle body images of various types of vehicles to be identified can be reconstructed by only using the first vehicle body reconstruction model generated through the deep learning algorithm, and the boundary identifier is identified on the basis of the vehicle body reconstruction image; therefore, the situation in the above-mentioned background section that only specific vehicles can be identified on the basis of rule is avoided, the identification accuracy rate of the boundary identifier is increased, and the identification speed is quickened, so as to eliminate safety risks to a great extent.

In the following, each step of the method for identifying a part of a vehicle in the exemplary embodiment will be further described.

In step S110, the vehicle body images of the vehicle to be identified are collected to acquire the vehicle body image sequence of the vehicle to be identified.

In the example embodiment, the vehicle to be identified may be motor vehicles like wagons with compartments, wagons without compartments, container trucks and passenger cars. When the vehicle to be identified enters a place for identifying, vehicle body images of the vehicle to be identified may be collected by a camera device to obtain a vehicle body image sequence. It should be noted that, the vehicle body image may be a side image of the vehicle to be identified, or a front image of the vehicle to be identified, which is not specifically limited in the exemplary embodiment.

Further, the method, before step S120, may also include: zooming a resolution of the collected vehicle body images of the vehicle to be identified to a preset resolution, and performing a grayscale stretching on the zoomed vehicle body images of the vehicle to be identified to obtain normalized images of the vehicle body images of the vehicle to be identified; and segmenting the normalized image with a fixed threshold value, wherein pixels in the normalized image greater than the threshold value are served as the body, and pixels in the normalized image less than or equal to the threshold value are served as a background. For example, the resolution of the collected image may be zoomed to 5 mm/pixel firstly, and then a grayscale stretching is performed on the zoomed image to obtain a normalized image. Since the normalized image may include some noises, at this time, the normalized image may be denoised by using a median filtering method. For example, the threshold value of the normalized image may be segmented with a fixed threshold value a, wherein pixels in the normalized image greater than the threshold value a are served as the vehicle body, and pixels in the normalized image less than or equal to the threshold value a are served as a background. By normalizing and denoising the acquired vehicle body image, the image may be applicable to the deep learning algorithm.

Still further, the collecting the vehicle body images of the vehicle to be identified may include: determining whether the position of the preset part is already acquired firstly; and when it is determined that the position of the preset part is not acquired yet, the vehicle body images collected before the current moment and at the current moment are inputted into the first vehicle body reconstruction model, i.e., step S120 is executed. For example, the system determines whether the position of the preset part of the vehicle to be identified is already acquired, and when it is determined that the position of the preset part is not acquired yet, the vehicle body images collected before the current moment and at the current moment are inputted into the first vehicle body reconstruction model to reconstruct the vehicle body images of the vehicle to be identified. When it is determined that the position of the preset part is already acquired, the collection of the vehicle body images of the vehicle to be identified is immediately stopped. From the foregoing, the collection of the vehicle body images of the vehicle to be identified is immediately stopped when determining that the position of the preset part has been already acquired. The identification of the boundary identifier of the vehicle to be identified may be completed without needing to collect all or most vehicle body images of the vehicle to be identified any longer, thus increasing the identification speed of the boundary identifier, further improving the vehicle safety inspection speed, and reducing the identification cost.

In another exemplary embodiment, the preset part of the vehicle to be identified is a vehicle head. For example, in a vehicle inspection system, a position of the vehicle head is acquired firstly by identifying the boundary identifier in the vehicle body reconstruction image of the vehicle to be identified. Then, when the vehicle enters a safety inspection region, ray irradiation is only performed on a compartment, avoiding the vehicle head, according to the acquired position of the vehicle head, so as to complete the vehicle safety inspection.

In step S120, the vehicle body is reconstructed by using the first vehicle body reconstruction model generated through the deep learning algorithm and on the basis of the vehicle body image sequence, so as to acquire the vehicle body reconstruction image of the vehicle to be identified.

In the example embodiment, the vehicle body image sequence of the vehicle to be identified is inputted to the first vehicle body reconstruction model generated through the deep learning algorithm, so as to acquire the vehicle body reconstruction image of the vehicle to be identified. The vehicle body images of various types of vehicles to be identified can be reconstructed by only using the first vehicle body reconstruction model generated through the deep learning algorithm, and the boundary identifier is identified on the basis of the vehicle body reconstruction image; therefore, the condition in the above-mentioned background section that only specific vehicles can be identified on the basis of rules is avoided, the identification accuracy rate of the boundary identifier is increased, and the identification speed is quickened, so as to eliminate safety risks to a great extent.

Further, the generating the first vehicle body reconstruction model through the deep learning algorithm may include: acquiring a plurality of first sample vehicle body images in which the preset parts are identified; acquiring a plurality of second sample vehicle body images in which the preset parts are to be identified; identifying the preset parts in the second sample vehicle body images through a preset deep learning algorithm to determine a first parameter of a second body reconstruction model; and inputting the first sample vehicle body images into the second body reconstruction model to correct the first parameter, so as to obtain the first vehicle body reconstruction model. For example, the first sample vehicle body image is set to be a test sample and the second sample vehicle body image is set to be a training sample, the preset part in the training sample is firstly identified by the preset depth learning algorithm to determine the first parameter of the second body reconstruction model, and then the test sample is inputted into the second body reconstruction model to correct the first parameter, so as to obtain the first vehicle body reconstruction image.

Still further, the identifying the preset parts in the second sample vehicle body images through the preset deep learning algorithm to determine the first parameter of the second body reconstruction model may be achieved through the following manner.

For example, the first parameter in a restricted Boltzmann machine model is initialized, and a training period, a learning rate and a parameter k of a training algorithm of the restricted Boltzmann machine model are set. Then, in the training period, the training algorithm is invoked, and the second sample vehicle body images are inputted into the restricted Boltzmann machine model for k times of trainings with reference to the learning rate and the parameter k to obtain an increment of the first parameter. And then, the first parameter is updated according to the increment of the first parameter, and the second body reconstruction model is obtained on the basis of the restricted Boltzmann machine model and the updated first parameter. For example, the first parameter is set to be a, b and W, the second sample vehicle body images are set to be the training samples, and the first parameters a, b and W are initialized, then the training period J, the learning rate η and the parameter k of the training algorithm are set, wherein the training algorithm is CD-k algorithm. Then, in the training period J, the CD-k algorithm is invoked with reference to the learning rate η and the parameter k, and at the same time, the training samples are inputted to the restricted Boltzmann machine model for k times of training, so as to obtain increments Δa, Δb and ΔW of the initialized first parameters. Then, the initialized first parameters a, b and W are updated on the basis of the increments Δa, Δb and ΔW of the initialized first parameters, wherein, $$W = W + \eta\left(\frac{1}{n_t}\Delta W\right), a = a + \eta\left(\frac{1}{n_t}\Delta a\right), b = b + \eta\left(\frac{1}{n_t}\Delta b\right).$$

Finally, the second body reconstruction model is obtained on the basis of the restricted Boltzmann machine model and the updated first parameters a, b and W.

For another example, a training period and running time in a cyclic neural network model are set firstly. Then, whether the training period ends is determined when the running time is t. When determining that the training period does not end, the second sample vehicle body images are inputted into the cyclic neural network model to obtain an $n^{th}$ output, the boundary identifier is identified for an $n^{th}$ time on the basis of the $n^{th}$ output, and the first parameter after $(n-1)^{th}$ adjustment is adjusted for an $n^{th}$ time on the basis of the $n^{th}$ identification of the boundary identifier. When determining that the training period ends, the second body reconstruction model is obtained on the basis of the first parameter after $(n-1)^{th}$ adjustment. For example, the training period and the running time in the cyclic neural network model are set firstly. Then, when the running time t=2 and when determining that the training period does not end, the second sample vehicle body images are inputted into the cyclic neural network model to obtain a second output, the boundary identifier is identified for the second time on the basis of the second output, and the first parameter after the first adjustment is adjusted for a second time on the basis of the second identification of the boundary identifier, so as to obtain the first parameter after the second adjustment. The second body reconstruction model may be obtained according to the above-mentioned process until the running period ends. When the running time t=2 and when determining that the training period ends, the second body reconstruction model is obtained on the basis of the first parameter after the first adjustment.

Still further, the method, after acquiring the vehicle body reconstruction image of the vehicle to be identified, may further include: determining a type of the vehicle to be identified on the basis of the vehicle body reconstruction image of the vehicle to be identified; wherein, after determining that the type of the vehicle to be identified belongs to a preset type, the boundary identifier between the preset part and other parts of the vehicle to be identified is identified to acquire the position of the preset part on the basis of the vehicle body reconstruction image of the vehicle to be identified. In the exemplary embodiment, the type of the vehicle to be identified may include: a passenger car, a wagon, and a truck, but the type of the vehicle in the exemplary embodiment is not limited thereto. The above-mentioned preset type may be a wagon, or a passenger carriage. The specific preset type may be set according to application scenarios. For example, it is assumed that the preset type is a wagon, then the type of the vehicle is determined according to the vehicle body reconstruction image of the vehicle when the vehicle enters the identification area. Moreover, when determining that the type of the vehicle is a wagon, the boundary identifier between the preset part and other parts of the vehicle is identified to acquire the position of the preset part on the basis of the vehicle body reconstruction image of the vehicle. The type of the vehicle to be identified is determined by determining the vehicle body reconstruction image of the vehicle to be identified.

In step S130, the boundary identifier between the preset part and other parts of the vehicle to be identified is identified on the basis of the vehicle body reconstruction image of the vehicle to be identified to acquire the position of the preset part.

Figure 2:
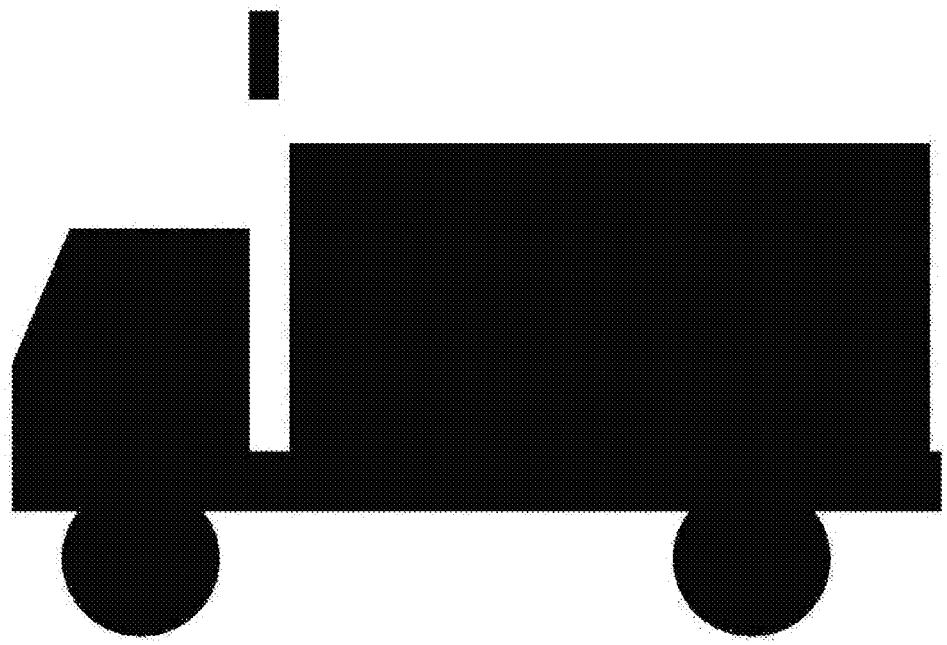
FIG. 2 is a schematic diagram of a boundary identifier in a vehicle body reconstruction image according to the present disclosure.

In the exemplary embodiment, the system may identify the boundary identifier in the vehicle body reconstruction image of the vehicle to be identified so as to acquire the position of the preset part. The preset part may be set freely according to application scenarios. For example, at an entrance of a residential area, the preset part may be a license plate; and in safety inspection, the preset part may be a vehicle head, which is not specifically limited by the exemplary embodiment. The boundary identifier means an icon used to distinguish the preset part from the other parts. As shown in FIG. 2, the boundary identifier is a small rectangle on the top of the vehicle to be identified in the figure, but in the exemplary embodiment, the expression manner of the boundary identifier is not limited thereto.

In addition, the above-mentioned drawings are merely schematic representations of processes included in the method according to the exemplary embodiments of the present disclosure, and not intended for limitation. It is easy to understand that the processes shown in the above drawings do not indicate or limit the chronological order of these processes. In addition, it is also easy to understand that these processes may be performed, for example, synchronously or asynchronously in multiple modules.

Figure 3:
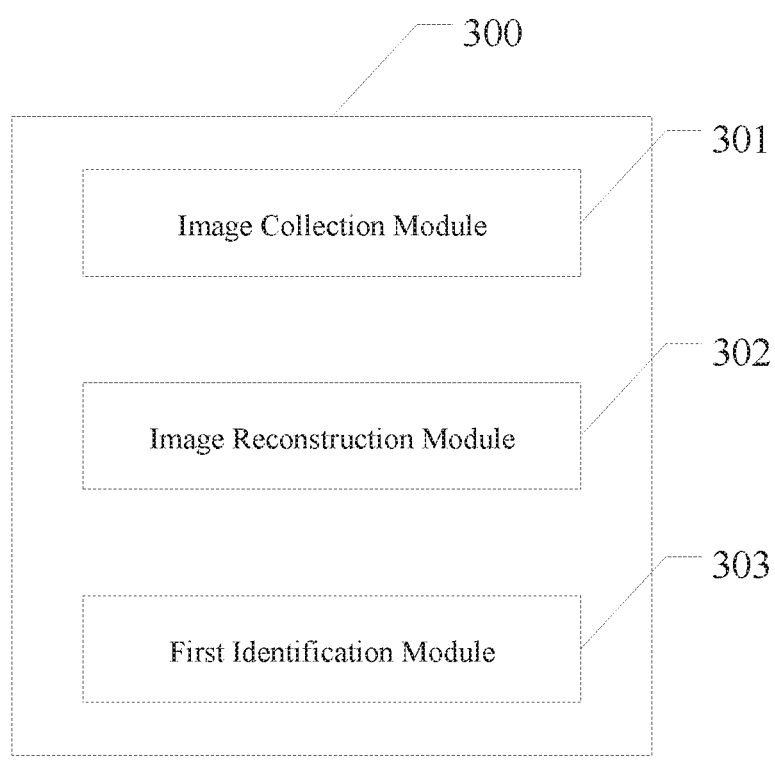
FIG. 3 is a block diagram of a system for identifying a part of a vehicle according to the present disclosure.

In the exemplary embodiments of the present disclosure, there is also provided a system for identifying a part of a vehicle. As shown in FIG. 3, the system for identifying a part of a vehicle 300 may include: an image collection module 301, an image reconstruction module 302 and a first identification module 303.

The image collection module 301 may be configured to collect vehicle body images of a vehicle to be identified to acquire a vehicle body image sequence of the vehicle to be identified.

The image reconstruction module 302 may be configured to reconstruct the vehicle body by using a first vehicle body reconstruction model generated through a deep learning algorithm and on the basis of the vehicle body image sequence to acquire a vehicle body reconstruction image of the vehicle to be identified.

The first identification module 303 may be configured to identify a boundary identifier between a preset part and other parts of the vehicle to be identified to acquire a position of the preset part.

In an exemplary embodiment of the present disclosure, the system may further include:

a first determination module, which may be configured to determine a type of the vehicle to be identified on the basis of the vehicle body reconstruction image of the vehicle to be identified; and the first identification module may be configured to, after determining that the type of the vehicle to be identified belongs to a preset type, identify the boundary identifier between the preset part and other parts of the vehicle to be identified to acquire the position of the preset part on the basis of the vehicle body reconstruction image of the vehicle to be identified.

In an exemplary embodiment of the present disclosure, a first vehicle body reconstruction module may be further included, which includes:

a first acquisition unit, which may be configured to acquire a plurality of first sample vehicle body images in which the preset parts are identified;

a second acquisition unit, which may be configured to acquire a plurality of second sample vehicle body images in which the preset parts are to be identified;

a parameter determination unit, which may be configured to identify the preset part in the second sample vehicle body images through a preset deep learning algorithm to determine a first parameter of a second body reconstruction model; and a vehicle body reconstruction unit, which may be configured to input the first sample vehicle body images into the second body reconstruction model to correct the first parameter to obtain the first vehicle body reconstruction model.

In an exemplary embodiment of the present disclosure, the identifying the preset parts in the second sample vehicle body images through the preset deep learning algorithm to determine the first parameter of the second body reconstruction model may include:

initializing the first parameter in a restricted Boltzmann machine model, and setting a training period, a learning rate and a parameter k of a training algorithm of the restricted Boltzmann machine model;

invoking the training algorithm in the training period, and inputting the second sample vehicle body images into the restricted Boltzmann machine model for k trainings with reference to the learning rate and the parameter k to obtain an increment of the first parameter; and updating the first parameter according to the increment of the first parameter, and obtaining the second body reconstruction model on the basis of the restricted Boltzmann machine model and the updated first parameter.

In an exemplary embodiment of the present disclosure, the identifying the preset parts in the second sample vehicle body images through the preset deep learning algorithm to determine the first parameter of the second body reconstruction model may include:

setting a training period and running time in a cyclic neural network model;

determining whether the training period ends when the running time is t;

inputting the second sample vehicle body images into the cyclic neural network model to obtain an $n^{th}$ output when determining that the training period does not end, identifying the boundary identifier for an $n^{th}$ time on the basis of the $n^{th}$ output, and adjusting the first parameter after $(n-1)^{th}$ adjustment for an $n^{th}$ time on the basis of the $n^{th}$ identification of the boundary identifier; and obtaining the second body reconstruction model on the basis of the first parameter after $(n-1)^{th}$ adjustment when determining that the training period ends.

In an exemplary embodiment of the present disclosure, the system, before the image reconstruction module, may further include:

an image normalization module, which may be configured to zoom a resolution of the collected vehicle body image of the vehicle to be identified to a preset resolution, and perform a grayscale stretching on the zoomed vehicle body image of the vehicle to be identified to obtain a normalized image of the vehicle body image of the vehicle to be identified; and a threshold value segmentation module, which may be configured to segment the normalized image with a fixed threshold value, wherein pixels in the normalized image greater than the threshold value are served as the vehicle body, and pixels in the normalized image less than or equal to the threshold value are served as a background.

In an exemplary embodiment of the present disclosure, the image collection module may include:

a second determination unit, which may be configured to determine whether the position of the preset part is already acquired; and an image input unit, which may be configured to input vehicle body images collected before the current moment and at the current moment into the first vehicle body reconstruction model when determining that the position of the preset part is not acquired yet.

In an exemplary embodiment of the present disclosure, the preset part of the vehicle to be identified may be a vehicle head.

According to an aspect of the present disclosure, there is provided a vehicle inspection system, wherein the system may include any one of the above-mentioned system for identifying a part of a vehicle.

In the exemplary embodiment, for example, the above vehicle inspection system may include a system for identifying a part of a vehicle, a control system, and a radiation imaging system. The system for identifying a part of a vehicle may be used to identify the head position of the vehicle to be inspected. The control system may be configured to control a ray source to emit radiation to irradiate the vehicle to be inspected according to the head position of the vehicle to be inspected. The radiation imaging system may include a ray source for emitting rays and a detector for detecting rays transmitted through the vehicle to be inspected and/or scattered rays, and is configured to image the vehicle to be inspected according to the rays detected by the detector. As described above, when the vehicle to be inspected enters a vehicle inspection region, the head position of the vehicle to be inspected is identified firstly. Then, the control system may control the ray source to emit rays to irradiate the vehicle to be inspected according to the head position of the vehicle to be inspected. When the head of the vehicle to be inspected enters a ray scanning area, the control system controls the ray source to scan with a low dose. When a compartment of the vehicle to be inspected enters the ray scanning area, the control system controls the ray source to scan with a high dose. Finally, the radiation imaging system images the vehicle to be inspected according to the rays detected by the detector, so as to complete the inspection of the vehicle to be inspected.

The specific details of each system for identifying a part of a vehicle have been described in detail in the corresponding method for identifying a part of a vehicle, and thus will not be elaborated herein.

It should be noted that although a plurality of modules or units of the device for action execution are mentioned in the detailed description above, such division is not mandatory. In fact, according to the embodiments of the present disclosure, the features and functions of two or more modules or units described above can be embodied in one module or unit. On the contrary, the features and functions of one module or unit described above can embodied by being further divided into more modules or units.

Based on the foregoing description of the embodiments, those skilled in the art can readily understand that the example embodiments described herein may be implemented by software, and may also be implemented by software in combination with necessary hardware. Therefore, the technical solutions according to the embodiments of the present disclosure can be embodied in the form of a software product which may be stored in a not-volatile storage medium (which may be a CD-ROM, a USB disk, a mobile hard disk drive, etc.) or network, including a number of instructions such that a computer device (which may be a personal computer, a server, an electronic device or a network device, etc.) performs the method according to the embodiments of the present disclosure.

Other embodiments of the present disclosure will readily occur to those skilled in the art upon consideration of the description and practice of the present disclosure disclosed herein. This application is intended to cover any variations, uses, or adaptations of the present application following the general principles thereof and including such departures from the present disclosure as come sense or customary practice in the art. The description and embodiments are exemplary only, and the true scope and spirit of the present disclosure are indicated by the claims.

It will be appreciated that the present disclosure is not limited to the exact construction that has been described above and illustrated in the accompanying drawings, and that various modifications and changes can be made without departing from the scope thereof. The scope of the present disclosure is limited by the appended claims only.

What is claimed is:

1. A method for identifying a part of a vehicle, comprising:
   collecting a vehicle body image of a vehicle to be identified to acquire a vehicle body image sequence of the vehicle to be identified;
   reconstructing the vehicle body by using a first vehicle body reconstruction model generated through a deep learning algorithm and on the basis of the vehicle body image sequence, to acquire a vehicle body reconstruction image of the vehicle to be identified; and
   identifying a boundary identifier between a preset part and other parts of the vehicle to be identified on the basis of the vehicle body reconstruction image of the vehicle to be identified, to acquire a position of the preset part,
   further comprising: generating the first vehicle body reconstruction model through the deep learning algorithm, which comprises:
   acquiring a plurality of first sample vehicle body images in which the preset parts are identified;
   acquiring a plurality of second sample vehicle body images in which the preset parts are to be identified;
   identifying the preset parts in the second sample vehicle body images through a preset deep learning algorithm to determine a first parameter of a second vehicle body reconstruction model; and
   inputting the first sample vehicle body images into the second vehicle body reconstruction model to correct the first parameter, so as to obtain the first vehicle body reconstruction model.

2. The method for identifying a part of a vehicle according to claim 1, further comprising:
   determining a type of the vehicle to be identified on the basis of the vehicle body reconstruction image of the vehicle to be identified;
   wherein, after it is determined that the type of the vehicle to be identified belongs to a preset type, the boundary identifier between the preset part and other parts of the vehicle to be identified is identified on the basis of the vehicle body reconstruction image of the vehicle to be identified, to acquire the position of the preset part.

3. The method for identifying a part of a vehicle according to claim 1, wherein the identifying the preset parts in the second sample vehicle body images through the preset deep learning algorithm to determine the first parameter of the second vehicle body reconstruction model comprises:
   initializing the first parameter in a restricted Boltzmann machine model, and setting a training period, a learning rate and a parameter k of a training algorithm of the restricted Boltzmann machine model;
   in the training period, invoking the training algorithm in combination with the learning rate and the parameter k, and inputting the second sample vehicle body images into the restricted Boltzmann machine model to perform training for k times, to obtain an increment of the first parameter; and
   updating the first parameter according to the increment of the first parameter, and obtaining the second vehicle body reconstruction model on the basis of the restricted Boltzmann machine model and the updated first parameter.

4. The method for identifying a part of a vehicle according to claim 1, wherein the identifying the preset parts in the second sample vehicle body images through the preset deep learning algorithm to determine the first parameter of the second vehicle body reconstruction model comprises:
   setting a training period and running time in a cyclic neural network model;
   determining whether the training period ends when the running time is t;
   when determining that the training period does not end, inputting the second sample vehicle body images into the cyclic neural network model to obtain an $n^{th}$ output, identifying the boundary identifier for an $n^{th}$ time on the basis of the $n^{th}$ output, and adjusting the first parameter after $(n-1)^{th}$ adjustment for an $n^{th}$ time on the basis of the $n^{th}$ identification of the boundary identifier; and
   when determining that the training period ends, obtaining the second vehicle body reconstruction model on the basis of the first parameter after $(n-1)^{th}$ adjustment.

5. The method for identifying a part of a vehicle according to claim 1, wherein the method, before the reconstructing the vehicle body by using the first vehicle body reconstruction model generated through the deep learning algorithm and on the basis of the vehicle body image sequence, further comprises:
  zooming a resolution of the collected vehicle body image of the vehicle to be identified to a preset resolution, and performing a grayscale stretching on the zoomed vehicle body image of the vehicle to be identified to obtain a normalized image of the vehicle body image of the vehicle to be identified; and
  segmenting the normalized image with a fixed threshold value, wherein a pattern formed by pixels in the normalized image greater than the fixed threshold value is determined as the vehicle body, and a pattern formed by pixels in the normalized image less than or equal to the fixed threshold value is determined as a background.

6. The method for identifying a part of a vehicle according to claim 1, wherein the collecting the vehicle body image of the vehicle to be identified comprises:
  determining whether the position of the preset part is already acquired; and
  when determining that the position of the preset part is not acquired yet, inputting a vehicle body image into the first vehicle body reconstruction model.

7. The method for identifying a part of a vehicle according to claim 6, wherein the preset part of the vehicle to be identified is a vehicle head.

8. A system for identifying a part of a vehicle, comprising:
  a processor;
  a memory for storing instructions executable by the processor;
  wherein the processor is configured to:
  collect a vehicle body image of a vehicle to be identified to acquire a vehicle body image sequence of the vehicle to be identified;
  reconstruct the vehicle body by using a first vehicle body reconstruction model generated through a deep learning algorithm and on the basis of the vehicle body image sequence, so as to acquire a vehicle body reconstruction image of the vehicle to be identified; and
  identify a boundary identifier between a preset part and other parts of the vehicle to be identified on the basis of the vehicle body reconstruction image of the vehicle to be identified, to acquire a position of the preset part,
  wherein the processor is further configured to:
  acquire a plurality of first sample vehicle body images in which the preset parts are identified;
  acquire a plurality of second sample vehicle body images in which the preset parts are to be identified;
  identify the preset parts in the second sample vehicle body images through a preset deep learning algorithm to determine a first parameter of a second vehicle body reconstruction model; and
  input the first sample vehicle body images into the second vehicle body reconstruction model to correct the first parameter, so as to obtain the first vehicle body reconstruction model.

9. The system for identifying a part of a vehicle according to claim 8, wherein the processor is further configured to:
  determine a type of the vehicle to be identified on the basis of the vehicle body reconstruction image of the vehicle to be identified; and
  after it is determined that the type of the vehicle to be identified belongs to a preset type, identify the boundary identifier between the preset part and other parts of the vehicle to be identified on the basis of the vehicle body reconstruction image of the vehicle to be identified, to acquire the position of the preset part.

10. The system for identifying a part of a vehicle according to claim 8, wherein the processor is further configured to:
  initialize the first parameter in a restricted Boltzmann machine model, and set a training period, a learning rate and a parameter k of a training algorithm of the restricted Boltzmann machine model;
  in the training period, invoke the training algorithm in combination with the learning rate and the parameter k, and input the second sample vehicle body images into the restricted Boltzmann machine model to perform training for k times, to obtain an increment of the first parameter; and
  update the first parameter according to the increment of the first parameter, and obtain the second vehicle body reconstruction model on the basis of the restricted Boltzmann machine model and the updated first parameter.

11. The system for identifying a part of a vehicle according to claim 8, wherein the processor is further configured to:
  set a training period and running time in a cyclic neural network model;
  determine whether the training period ends when the running time is t;
  when determining that the training period does not end, input the second sample vehicle body images into the cyclic neural network model to obtain an $n^{th}$ output, identify the boundary identifier for an $n^{th}$ time on the basis of the $n^{th}$ output, and adjust the first parameter after $(n-1)^{th}$ adjustment for an $n^{th}$ time on the basis of the $n^{th}$ identification of the boundary identifier; and
  when determining that the training period ends, obtain the second vehicle body reconstruction model on the basis of the first parameter after $(n-1)^{th}$ adjustment.

12. The system for identifying a part of a vehicle according to claim 8, wherein the processor is further configured to:
  zoom a resolution of the collected vehicle body image of the vehicle to be identified to a preset resolution, and perform a grayscale stretching on the zoomed vehicle body image of the vehicle to be identified to obtain a normalized image of the vehicle body image of the vehicle to be identified; and
  segment the normalized image with a fixed threshold value, wherein a pattern formed by pixels in the normalized image greater than the fixed threshold value is determined as the vehicle body, and a pattern formed by pixels in the normalized image less than or equal to the fixed threshold value is determined as a background.

13. The system for identifying a part of a vehicle according to claim 8, wherein the processor is further configured to:
  determine whether the position of the preset part is already acquired; and
  when determining that the position of the preset part is not acquired yet, input a vehicle body image into the first vehicle body reconstruction model.

14. The system for identifying a part of a vehicle according to claim 13, wherein the preset part of the vehicle to be identified is a vehicle head.

15. A vehicle inspection system, comprising an system for identifying a part of a vehicle, wherein the system for identifying a part of a vehicle comprises:

a processor;

a memory for storing instructions executable by the processor;

wherein the processor is configured to:

collect a vehicle body image of a vehicle to be identified to acquire a vehicle body image sequence of the vehicle to be identified;

reconstruct the vehicle body by using a first vehicle body reconstruction model generated through a deep learning algorithm and on the basis of the vehicle body image sequence, so as to acquire a vehicle body reconstruction image of the vehicle to be identified; and identify a boundary identifier between a preset part and other parts of the vehicle to be identified on the basis of the vehicle body reconstruction image of the vehicle to be identified, to acquire a position of the preset part wherein the processor is further configured to:

acquire a plurality of first sample vehicle body images in which the preset parts are identified;

acquire a plurality of second sample vehicle body images in which the preset parts are to be identified;

identify the preset parts in the second sample vehicle body images through a preset deep learning algorithm to determine a first parameter of a second vehicle body reconstruction model; and input the first sample vehicle body images into the second vehicle body reconstruction model to correct the first parameter, so as to obtain the first vehicle body reconstruction model.

\* \* \* \* \*